US011503148B2

(12) United States Patent
Tran et al.

(10) Patent No.: US 11,503,148 B2
(45) Date of Patent: Nov. 15, 2022

(54) ASYNCHRONOUS SHORT VIDEO COMMUNICATION PLATFORM BASED ON ANIMATED STILL IMAGES AND AUDIO

(71) Applicant: QaQaQ Inc., Toronto (CA)

(72) Inventors: Gardham J. Tran, Toronto (CA); Michael Spears, Toronto (CA)

(73) Assignee: QaQaQ Inc., Toronto (CA)

( * ) Notice: Subject to any disclaimer, the term of this patent is extended or adjusted under 35 U.S.C. 154(b) by 0 days.

(21) Appl. No.: 17/415,967

(22) PCT Filed: Dec. 18, 2019

(86) PCT No.: PCT/CA2019/051842
§ 371 (c)(1),
(2) Date: Jun. 18, 2021

(87) PCT Pub. No.: WO2020/124228
PCT Pub. Date: Jun. 25, 2020

(65) Prior Publication Data
US 2021/0385321 A1 Dec. 9, 2021

Related U.S. Application Data

(60) Provisional application No. 62/781,267, filed on Dec. 18, 2018.

(51) Int. Cl.
*G06F 3/0482* (2013.01)
*H04M 1/72439* (2021.01)
(Continued)

(52) U.S. Cl.
CPC ...... *H04M 1/72439* (2021.01); *G06F 3/0482* (2013.01); *G06F 3/0488* (2013.01);
(Continued)

(58) Field of Classification Search
CPC ...... H04N 5/76; H04W 4/12; H04M 1/72439; G11B 27/10; G06T 13/80; G06F 3/162; G06F 3/04845
See application file for complete search history.

(56) References Cited

U.S. PATENT DOCUMENTS 9,779,775 B2    10/2017 Pacurariu et al.
10,785,526 B1 *  9/2020 O'Neill ............. H04N 21/4825
(Continued)

OTHER PUBLICATIONS

International Search Report—PCT/CA2019/051842; Filing Date Apr. 18, 2019; 4 pages.

*Primary Examiner* — Andrea C Leggett
(74) *Attorney, Agent, or Firm* — Aird & McBurney LP

(57) ABSTRACT

A communication platform for enabling a sender to create video messages comprising of one or more still images, accompanied by sender audio pertaining to the still images at the point where the images have been rendered as video, wherein effects and filters are applied to the still images, the video message further comprising a timeline for synchronizing the sender audio to the still images and associated metadata; and send the video message to a recipient; and wherein the recipient can view the video message comprising the one or more still images with the associated effects and filters, with accompanying sender audio synchronized to the still images; and enabling the recipient to reply using the received still images with an option of using preset animation events from the sender to create a new video message comprising recipient audio and new effects and filters; and send to the sender or other recipients.

25 Claims, 16 Drawing Sheets

(51) Int. Cl.

| | |
|---|---|
| *G06F 3/04845* | (2022.01) |
| *G06F 3/0488* | (2022.01) |
| *G06F 3/16* | (2006.01) |
| *G06T 13/80* | (2011.01) |
| *G11B 27/10* | (2006.01) |
| *H04N 5/76* | (2006.01) |
| *H04W 4/12* | (2009.01) |

(52) U.S. Cl.
CPC .......... *G06F 3/04845* (2013.01); *G06F 3/162* (2013.01); *G06T 13/80* (2013.01); *G11B 27/10* (2013.01); *H04N 5/76* (2013.01); *H04W 4/12* (2013.01)

(56) References Cited

U.S. PATENT DOCUMENTS

| | | | |
|---|---|---|---|
| 11,265,413 B1* | 3/2022 | Sarafa | H04W 12/033 |
| 2015/0095433 A1* | 4/2015 | Grossman | G06F 16/94 |
| | | | 709/206 |
| 2015/0110467 A1* | 4/2015 | Ying | G11B 27/19 |
| | | | 386/241 |
| 2015/0350130 A1* | 12/2015 | Yang | G06F 3/0412 |
| | | | 715/752 |
| 2017/0236551 A1* | 8/2017 | Leiberman | G11B 27/28 |
| | | | 386/285 |
| 2018/0025751 A1* | 1/2018 | Patel | G06F 3/04847 |
| | | | 715/723 |
| 2018/0190323 A1* | 7/2018 | de Jong | G11B 27/28 |
| 2019/0018581 A1* | 1/2019 | Aronoff | H04L 51/10 |
| 2019/0065046 A1* | 2/2019 | Kwon | G06F 3/04886 |

* cited by examiner

ASYNCHRONOUS SHORT VIDEO COMMUNICATION PLATFORM BASED ON ANIMATED STILL IMAGES AND AUDIO

FIELD OF THE INVENTION

The present invention relates to communication methods and systems.

DESCRIPTION OF THE RELATED ART

Video is typically used when sender creates the video and receiver listens and views the video. Currently smartphones and related software/apps are not capable of unbundling a video file to raw elements for the purpose of replying to or creating video from received content inside a messaging system or platform.

It is an objective of the present invention to mitigate or obviate at least one of the above-mentioned disadvantages.

SUMMARY OF THE INVENTION

In one of its aspects, there is provided a messaging method comprising:

a) at a first communication device, selecting a first at least one image stored on a first computer readable medium associated with the first communication device;

b) presenting the first at least one image on a first display screen associated with the first communication device;

c) detecting pressure applied on the first at least one image on the display screen to actuate recording of a first audio signal via a microphone associated with the device to generate first audio data;

d) manipulating the at least image to augment the at least one image;

e) simultaneously recording a first on-screen video while manipulating the first at least one image to generate first video data;

f) initiating a first timeline associated with the recording of the first audio signal and the recording of the first on-screen video;

g) detecting the absence of the touch on the first at least one image on the touch-sensitive display screen to terminate recording of the first audio signal and terminating the first timeline;

h) storing in a first message file on the first computer readable medium the first video data, the first audio data, the first timeline, and first metadata associated with at least one of the at least one image, the first on-screen video, the first audio signal, the first timeline; and i) transmitting the message file to a second communication device.

In another of its aspects, there is provided a messaging method comprising:

at a first communication device, (a) detecting a touch on a first at least one image on a display screen to actuate recording of a first audio signal via a microphone associated with the first communication device to generate first audio data;

b) manipulating the at least image to create an augmented first at least one image;

c) simultaneously recording the creation of the augmented first at least one image to generate first video data;

d) initiating a first timeline associated with the recording of the first audio signal and the recording the creation of the augmented first at least one image;

e) detecting the absence of the touch on the first at least one image on the touch-sensitive display screen to terminate recording of the first audio signal and terminating the first timeline;

f) storing in a first message file on the first computer readable medium the first video data, the first audio data, the first timeline, and first metadata associated with at least one of the at least one image, the first on-screen video, the first audio signal, the first timeline; and g) transmitting the first message file for playback at a second communication device.

In another of its aspects, there is provided a method of communication comprising the steps of, at a second communication device, a) receiving a first message file from a first communication device and storing the first message file on a second computer readable medium associated with the second communication device, said first message file comprising first video data comprising a first on-screen video associated with an augmented first image, first audio data comprising a first audio signal, a first timeline associated with the augmented first image and the first audio signal, and first metadata;

b) accessing the stored first video data, the first audio data, the first timeline, and first metadata;

c) presenting on a second display screen associated with the second communication device the first on-screen video and the first audio signal in accordance with the first timeline;

d) detecting a touch on the first on-screen video on the second display screen to actuate recording of a second audio signal via a second microphone associated with the second communication device;

e) erasing the stored first video data, the first audio data, the first timeline, and first metadata while preserving the first at least one image;

f) manipulating the first at least one image to create a new augmented first at least one image;

g) simultaneously recording the creation of the new augmented first at least one image to generate second video data;

h) initiating a second timeline associated with the recording of the second audio signal and the recording the creation of the new augmented first at least one image;

i) detecting the absence of the touch on the first at least one image on the touch-sensitive display screen to terminate recording of the second audio signal and terminating the second timeline;

j) storing in a second message file on the second computer readable medium the second video data, the second audio data, the second timeline, and second metadata associated with at least one of the at least one image, the second on-screen video, the second audio signal, and the second timeline;

k) transmitting the second message file to the first communication device;

l) at the first communication device, receiving the second message file and storing the second message file on the first computer readable medium;

m) accessing the stored second video data, the second audio data, the second timeline, and second metadata; and n) presenting on the first display screen associated with the first communication device the second on-screen video and the second audio signal in accordance with the second timeline.

In another of its aspects, there is provided a computer product comprising instructions stored on a computer readable medium, the instructions executable by a processor to at least:
- at a first communication device,
  - (a) detect a touch on a first at least one image on a display screen to actuate recording of a first audio signal via a microphone associated with the first communication device to generate first audio data;
  - b) manipulate the at least image to create an augmented first at least one image and simultaneously record the creation of the augmented first at least one image to generate first video data;
  - d) initiate a first timeline associated with the recording of the first audio signal and the recording the creation of the augmented first at least one image;
  - e) detect the absence of the touch on the first at least one image on the touch-sensitive display screen to terminate recording of the first audio signal and terminating the first timeline;
  - f) store in a first message file on the computer readable medium the first video data, the first audio data, the first timeline, and first metadata associated with at least one of the at least one image, the first on-screen video, the first audio signal, the first timeline; and
  - g) transmit the first message file for playback at a second communication device.

In another of its aspects, there is provided an originating device comprising:
- instructions stored on a first computer readable medium, the instructions executable by a processor to at least:
  - detect a touch on a first at least one image on a display screen to actuate recording of a first audio signal via a microphone associated with the first communication device to generate first audio data;
  - manipulate the at least one image to create an augmented first at least one image and simultaneously record the creation of the augmented first at least one image to generate first video data;
  - initiate a first timeline associated with the recording of the first audio signal and the recording the creation of the augmented first at least one image;
  - detect the absence of the touch on the first at least one image on the touch-sensitive display screen to terminate recording of the first audio signal and terminating the first timeline;
  - store in a first message file on the first computer readable medium the first video data, the first audio data, the first timeline, and first metadata associated with at least one of the at least one image, the first audio signal, the first timeline; and
  - transmit the first message file for playback at a recipient device.

In another of its aspects, there is provided a method of creating a video at a first communication device, the first communication device comprising a computer readable medium with instructions stored thereon, the instructions executable by a processor to at least:
- auto-load a predetermined number of images captured by a camera associated with the first communication device or stored in the computer readable medium are auto-loaded onto a display screen associated with the first communication device;
- implement at least one preset animation on the predetermined number of images to create augmented images and generate a first video data; and
- actuate recording of a first audio signal via a microphone associated with the first communication device to generate first audio data, wherein the first audio signal pertains to the augmented images.

Advantageously, the present system and method allows a user to create a short video using any visual on a computing device e.g. still images or existing video, to expeditiously animate these media assets, and/or include annotations, voice overs and other effects, timelines, metadata, and package them into a video message file for transmittal to a recipient(s) via a short video messaging platform. Upon receipt by the recipient, the video message files are expeditiously unpacked to enable the recipient to play the short video, and should the recipient choose to respond then any of the video message file assets may be incorporated in the response. Accordingly, the response may include any of the received assets e.g. still images or video, with new annotations, effects and audio. The originating and the recipient devices include an application program having processor-executable instructions to easily create and edit a short video, package the media assets and associated timelines and metadata into a video message file, transmit/receive the video message file and unpack the video message file for playback of the short video using minimal computational overhead, in real time or near real time, for asynchronous short video communication.

BRIEF DESCRIPTION OF THE DRAWINGS

Several exemplary embodiments of the present invention will now be described, by way of example only, with reference to the appended drawings in which.

DETAILED DESCRIPTION OF EXEMPLARY EMBODIMENTS

The detailed description of exemplary embodiments of the invention herein makes reference to the accompanying block diagrams and schematic diagrams, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Figure 1:
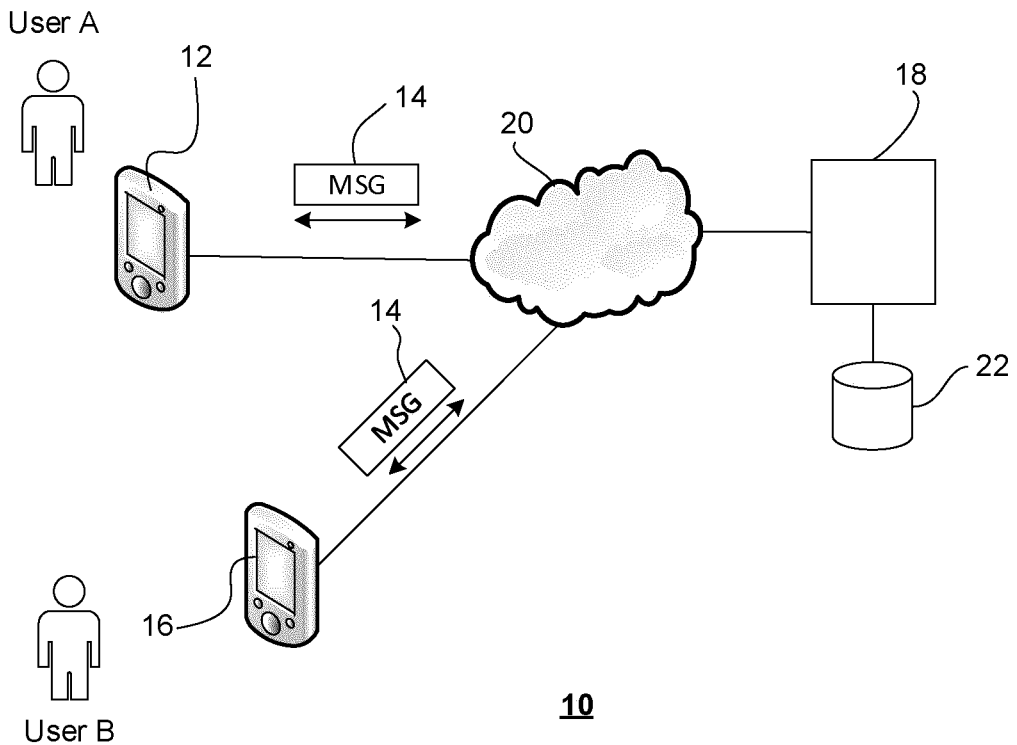
FIG. 1 shows a top-level component architecture diagram of a communication system.
Figure 2:
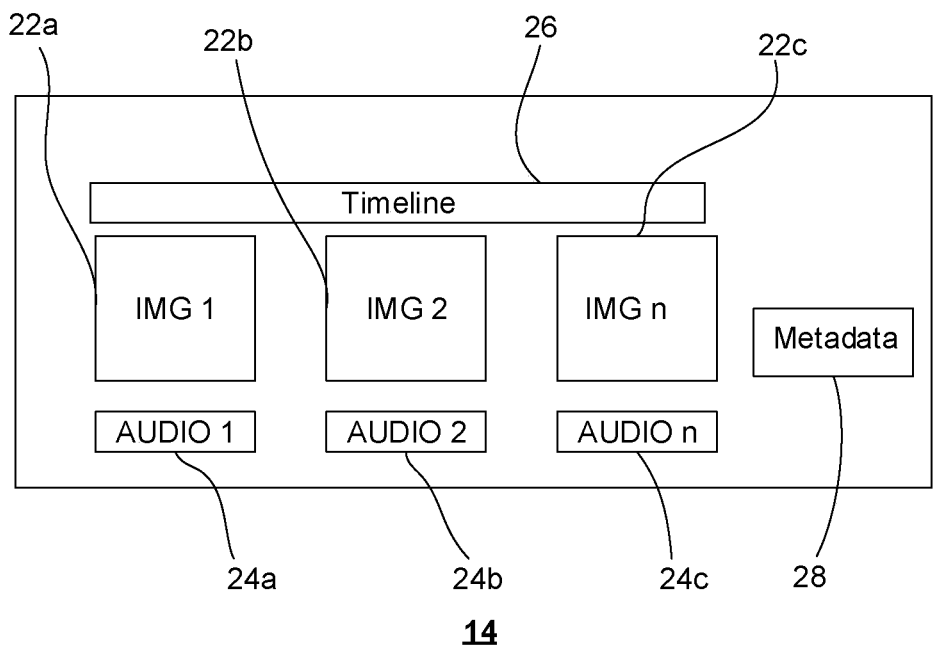
FIG. 2 shows components of a video message file.

Referring to FIG. 1 there is shown a top-level component architecture diagram for implementing an asynchronous short video communication platform based on animated still images and audio, generally indicated by numeral 10. System 10 comprises user A associated with user device 12 exchanging video message files 14 with user B associated with user device 16 via communication server 18 in communication network 20. As shown in FIG. 2, the short video comprises a plurality of images 22a-n and audio content 24a-n pertaining to images 22a-n, and packaged as video message file 14, including associated timeline 26 and associated metadata 28, as will be described in more detail below.

Figure 3A:
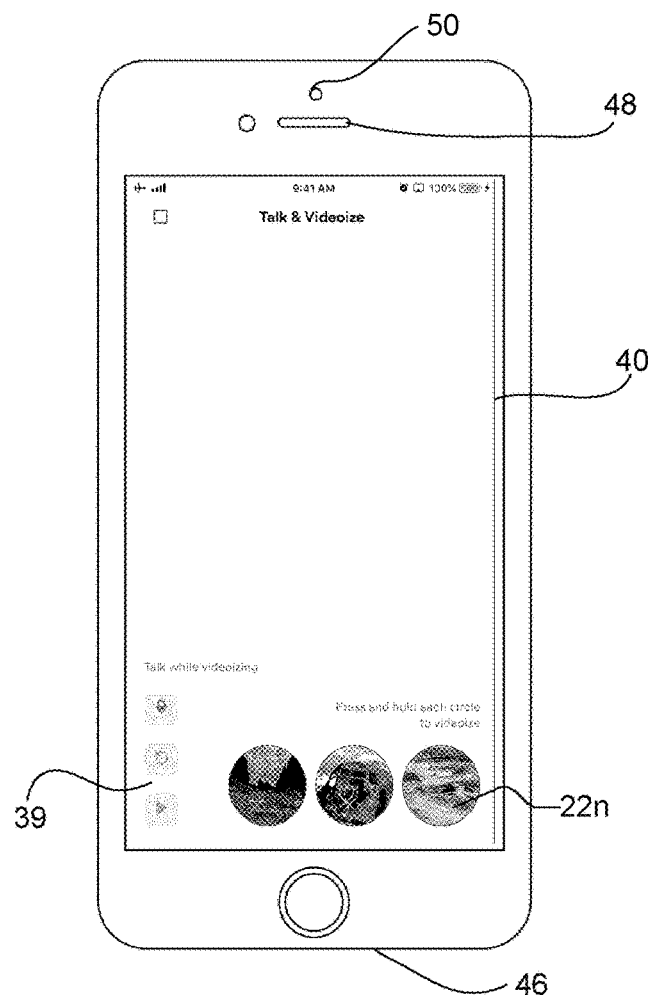
FIG. 3a shows an exemplary user interface.
Figure 3B:
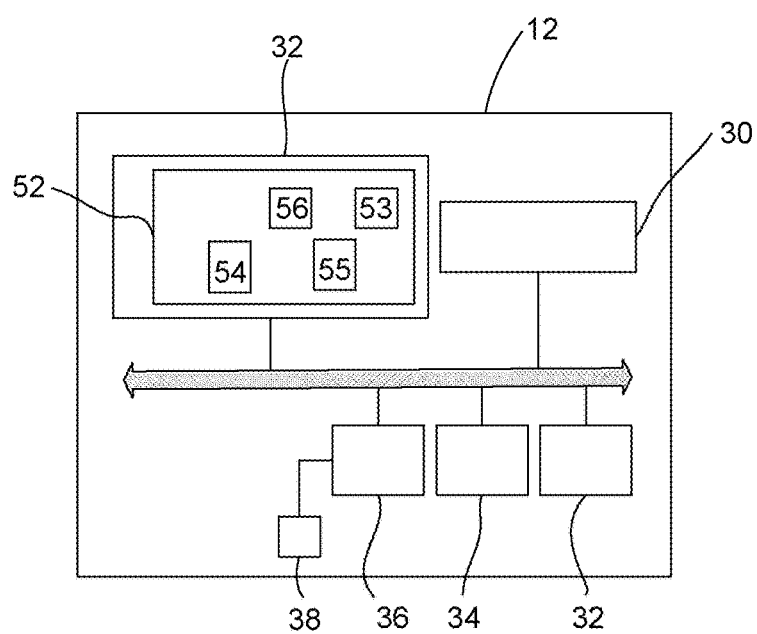
FIG. 3b shows an exemplary computing system of a user device.

Looking at FIGS. 3a and 3b, user device 12 or 16 includes but is not limited to a smartphone device, a tablet, a laptop, a virtual reality headset, an augmented reality device, a network connected camera, a gaming console, and a desktop computer. For example, user device 12 includes processor 30, computer readable medium 32 comprising instructions stored thereon and executable by processor 30 to create a video message from one or more selected images, along with received user A audio associated the one or more selected images, package the one or more selected images, including associated audio into video message file 14. User device 12, 16 also include specialized processors, such as graphics processing system 34 for manipulating images and video elements, and input/output interface 36. Coupled to input/output interface 36 are input/output devices such as communication interface 38, user interface 39, display 40, keyboard (physical or on-screen), microphone 46, speaker 48, and camera 50. Memory 32 comprises application programs, such as mobile application 52, executable by processor 30 to present display elements on user interface 39, including retrieve image and video elements from memory 32 for presentation on user interface 39. Mobile application 52 comprises messenger application 53 executable by processor 30 to transmit message package to recipient user device 16 to server 18 via communication network 20. Generally, communication network 20 includes one or more of the following: a mobile communication network, the Internet, a direct or indirect, physical communication connection, a Wide Area Network, a Storage Area Network, and any other form of connecting two or more systems, components, or storage devices together. Video message file 14 is unpacked at recipient user device 16, having similar components to user device 12 and the video message, along with received user A audio are played back via mobile application 52.

As an example, user device 12 may be a smartphone device that a user creates photos and videos with by using camera 50. Photos and videos captured with user device 12 are saved on memory storage 32. Associated with mobile application 52 is message editor, 54 for composing and editing short videos and animation module 55, which is a general purpose system for animating views and other visual elements or objects within application 52, such as images 22a-n, videos and so forth. Animation module 55 caches the contents of views into bitmaps that can be manipulated directly by graphics processing system 34. Accordingly, animation module 55 allows user A or B to animate changes to the views and visual objects on display 42, such as modifying the properties of the visual objects. For example, animation module 55 can animate changes to a view's position, size, or opacity, or move a view's content around the screen, fade that content in or out, apply arbitrary graphics transformations to the view, or change the view's other visual attributes. Also, associated with mobile application 52 is message player 56 for playing received video message files 14, including animations associated with images 22a-n and accompanying audio 24a-n.

FIG. 4 shows flowchart 100 outlining exemplary steps for implementing the communication method. In step 102, user device comprising memory 32 with instructions of software application 52 stored thereon, the instructions being executable by processor 30, presents user interface 39 on display 42, which allows for a selection of images 22a-n to include in the short video. As an example, using editor 54 images 22a-n may be selected from the last three images captured by camera 50 (step 102). Alternatively, the last three or more captured images (still images or video) are auto-loaded from a camera roll or library associated with user device 12, 16 into software application 52, and presented on display 42. Once images 22a-n are loaded, in step 103, a determination is made whether preset animation events are enabled, and when the preset animations are enabled then the preset animations are automatically effected in step 104. For example, still images 22a-n may be subjected to a preset animation e.g. forward and reverse zooming. Next, user A can initiate the audio recording function on user device 12 and start commenting on images 22a-n (step 105) while animation events are simultaneously implemented with images as video. In step 106, when the preset animation events are not enabled, then the user may animate or manipulate the still images or video 22a-n e.g. forward zooming or reverse zooming. Following step 106, the process returns to step 105 in which user A records commentary associated with images 22a-n while animation events are simultaneously implemented with images 22a-n as video. In step 107, the created video may be further enhanced by adding special effects, filters, and sounds, and so forth. The length of video generated from animating images 22a-n may be set to a predetermined time period e.g. 37 seconds, such that user A may record audio commentary pertaining to images 22a-n during that time frame. At the expiry of the predetermined time period, the generated video and recorded audio, associated timeline and associated metadata are packaged into video message file 14 or proprietary file (step 108). Next, using software application 52, user A selects a recipient to send video message file 14 to via native messenger application 53 associated with software application 52 (step 110).

Video message file 14 is received by server 18 and relayed to recipient user B at user device 16 via communication network 20 (step 112). User device 16 comprises similar components to user device 12 and also includes software application 52 native with messenger application 53. Accordingly, when video message file 14 is opened, software application 52 unpacks video message file 14, and the components of video message file 14 i.e. video comprising images 22*a-n* including any of the special effects and sounds, synchronized with accompanying commentary 24*a-n*, and metadata for playback in accordance with the timeline (step 114). If user B chooses to reply to the received message, then the original audio commentary of user A, special effects, filters and sounds, metadata, timeline are erased, while keeping the original images 22*a-n* intact. Accordingly, images 22*a-n* are auto-loaded into software application 52 and presented on display 42', and user B can reply to user A's short video (step 116). Accordingly, using software application 52, user B is able to use the auto-loaded images 22*a-n* of video message file 14 in a reply video message file 14' to user A, or video message file 14' to another recipient or recipients (step 118). For example, auto-loaded images 22*a-n* received from user A are presented on display 42' of user device 16, in step 119, a determination is made whether preset animation events are enabled, and when the preset animations are enabled then the preset animations are automatically effected in step 120. For example, still images 22*a-n* may be subjected to a preset animation e.g. forward and reverse zooming. Next, user B can initiate the recording function on user device 16 by pressing on any one of auto-loaded images 22*a'-c'* and provide audio commentary on images 22*a'-c'* (step 121), while animation events are simultaneously implemented with images 22*a'-c'* as video. In step 122, the created video may be further enhanced by adding special effects, filters, and sounds, and so forth. In step 119, when the preset animation events are not enabled, then user B may animate or manipulate the still images or video 22*a'-c'* e.g. forward zooming or reverse zooming. In step 123, the created video may be further enhanced by adding special effects, filters, and sounds, and so forth. Similarly, the length of video generated from animating images 22*a'-c'* may be set to a predetermined time period e.g. 37 seconds, such that user B may record audio commentary pertaining to images 22*a'-c'* for that duration. At the expiry of the predetermined time period, generated video and recorded audio 24*a'-n'* are packaged in video message file 14' having the same file format as video message file 14 (step 124). Next, using software application 52 user B selects a recipient e.g. user A, or user C, or users D, E . . . n to send video message file 14' to via native messenger application 53 associated with software application 52 (step 126).

When any of user A, user C, or users D, E . . . n receive video message file 14' they can respond to using the steps described above. A recipient may add their own images to the conversation, by adding one or more messages to the existing images, replacing one or more of the received images, or including a new set of images.

In more detail, looking once again at step 104, once images 22*a-n* are loaded, user A can initiate the audio recording function on user device 12 and start commenting on images 22*a-n*, and audio signals from user A are captured by microphone 46. Audio recording begins when user touches one of images 22*a-n*, e.g. image 22*a*, and a timeline is initiated. When the user lifts their finger from image 22*a*, the audio recording is paused.

The user's commentary e.g. annotation, narration, and storytelling, is influenced by the fact that images are already animated during this process which spontaneously influences how, what, and the timing of the user's commentary. Additionally, the releasing a user's digit from the image pauses the audio recording of the commentary and allows the user to collect their thoughts and only have to provide commentary to the images, which will be animated, as they are being displayed, including any subsequent real time implemented animation events.

If user chooses to zoom in or out on a portion of image 22*a*, then animation module 55 animates views and other visual elements of image 22*a*. Software application 52 provides the start time, and the duration and maximum zoom to animation API 60. If user desires to cross-fade from one image 22*a* to another image 22*b*, software application 52 initiates a cross-fade animation with the Core Animation API, providing the start time and duration for the fade. Core Animation API 60 animates image 22*a* (zoom, crossfade etc.) in real time during recording and playback. When the user initiates (or ends) an animation, the current time stamp of the audio recording is noted in the timeline, along with the type of animation event. Video message file 14 may include the following format: audio (CAF format), timeline data (JSON format), images (JPG format), and metadata (JSON format), stored together in a single output file having a known file format, or a proprietary file format. As an example, video message output file 14 may be .zip archived file having a ZIP archive header, a ZIP central directory header, and a ZIP end of central directory header.

Output file 14 is uploaded from user device 12 to server 18, and server 18 transmits output file 14 via communication network 20 to recipient device 16. For playback, mobile application 52 on device 16 unpacks output file 14 to access the files contained therein. Accordingly, message player 55 reads the timeline and queues a series of animations and transformations with the Core Animation API 60, based on the events listed in the timeline. During playback, Core Animation animates the images (zooms, crossfades) in time synchronized with audio playback. To reply or forward a message, mobile application 52 duplicates the message archive, and updates the message metadata with the new sender, recipient, location, time, etc. The original images are copied into the new archive when the archive is duplicated. When the user records a new message, the new audio data and timeline overwrite the original data in the new copy.

In one exemplary implementation, editor 54 and player 55 use AVFoundation from Apple Inc., U.S.A. to play, create, edit QuickTime movies and MPEG-4 files, and play HLS streams. Accordingly, mobile application 52 uses the AV Foundation API to export the document to a QuickTime movie file. Images are loaded as layer objects into an AV Mutable Video Composition object, and events from the timeline are queued in Core Animation. The audio file is assigned to an audio track in the AV Mutable Video Composition object. AV Foundation renders a QuickTime video and executes the queued timeline animation events during rendering to create a QuickTime file that is saved to the device camera roll.

In one exemplary implementation, enhanced transcription module is included to enable voice transcription on the short video, which is beneficial to sound impaired users during playback or review, which enhance the user experience.

In one exemplary implementation, voice AI is integrated with mobile application program 52 and therefore machine learning techniques for user/speaker identification, sentiment analysis, emotion detection and the real-time evaluation of user/speaker characteristics are employed.

In one exemplary implementation, the effects at the user's disposal include AI driven parallax zoom effects for still images 22*a-n*.

Figure 4A:
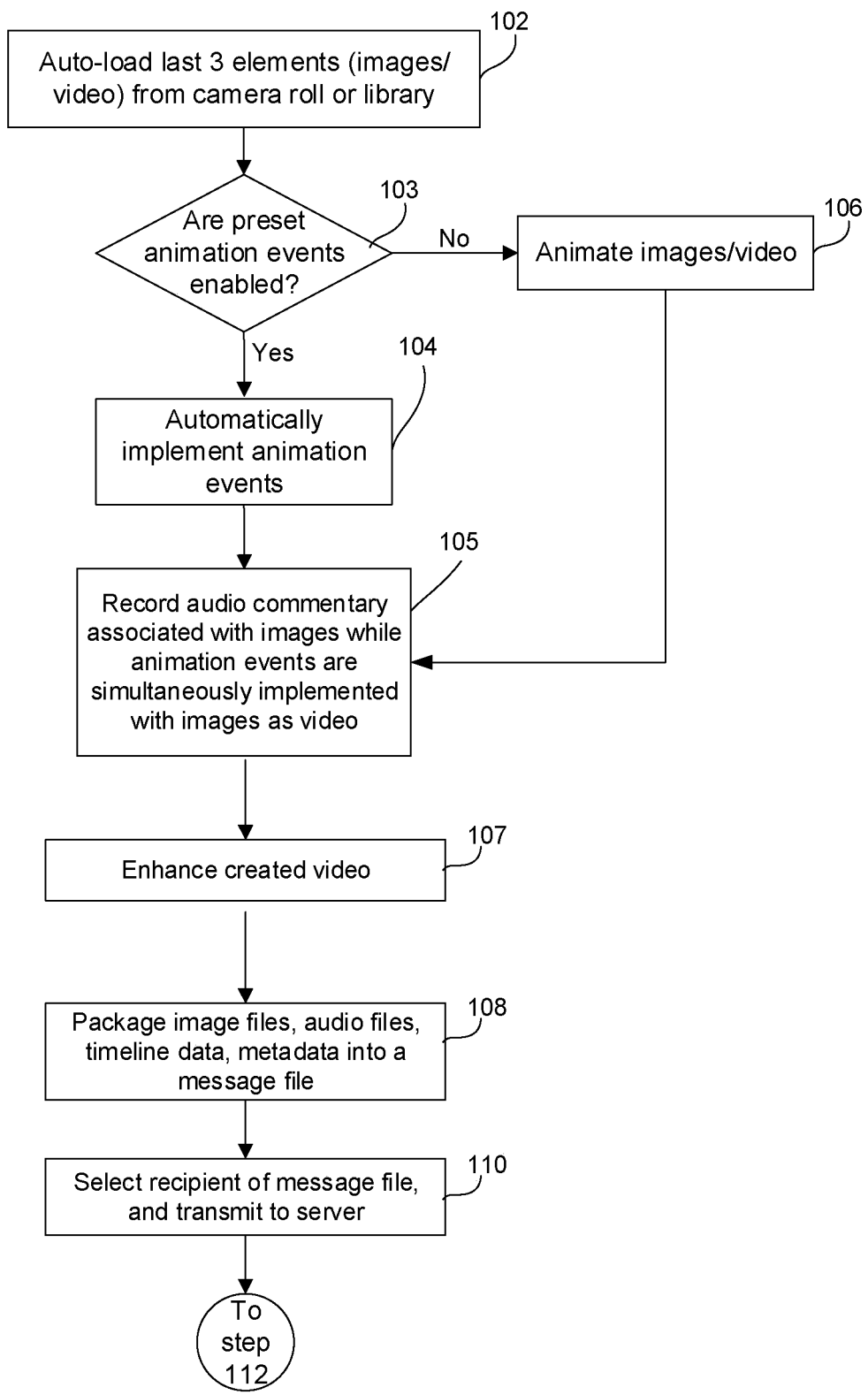
FIG. 4a shows a flowchart with exemplary steps for creating a video message file at an originating device.
Figure 4B:
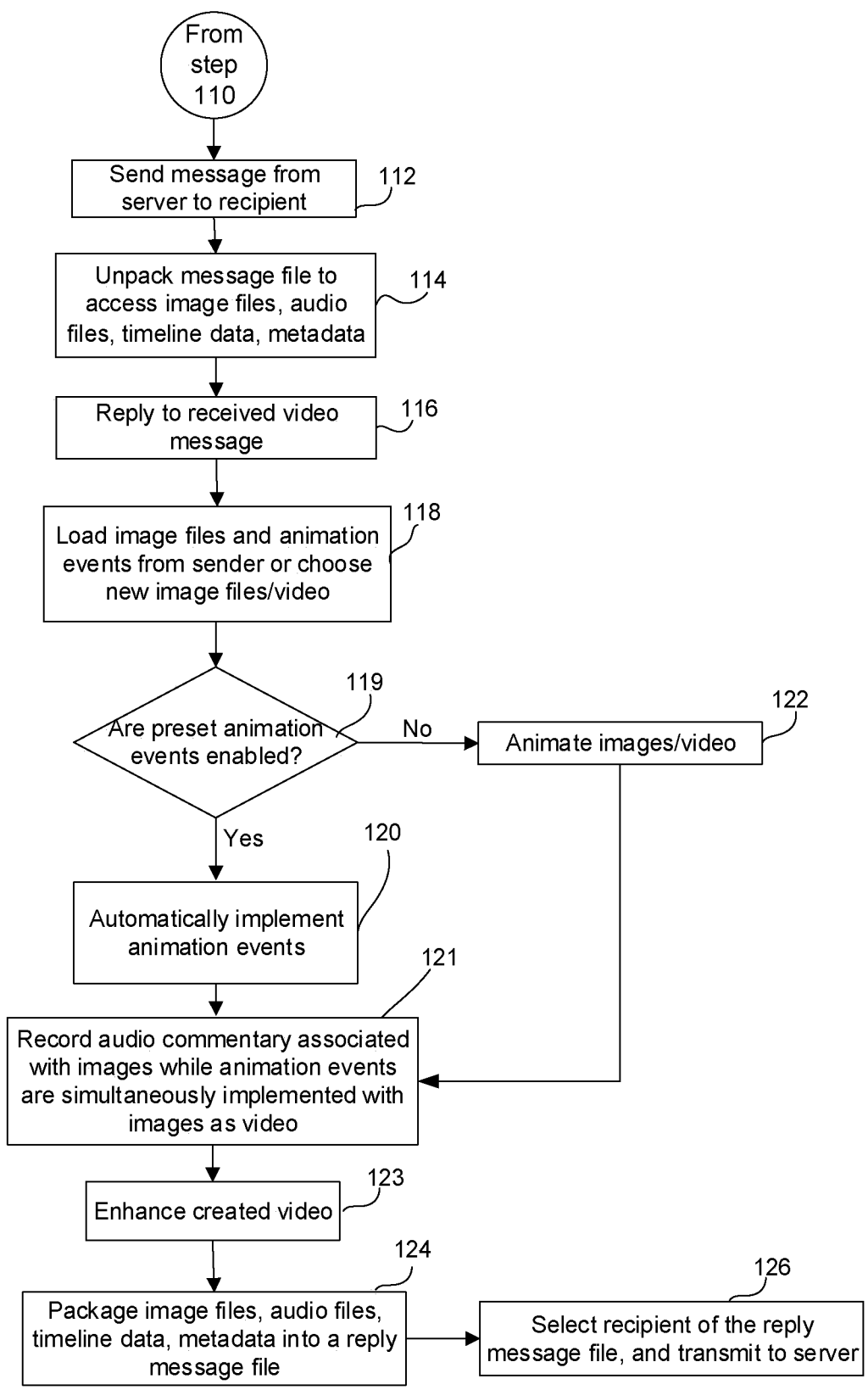
FIG. 4b shows a flowchart with exemplary steps for receiving the video message file at the recipient device.
Figure 4C:
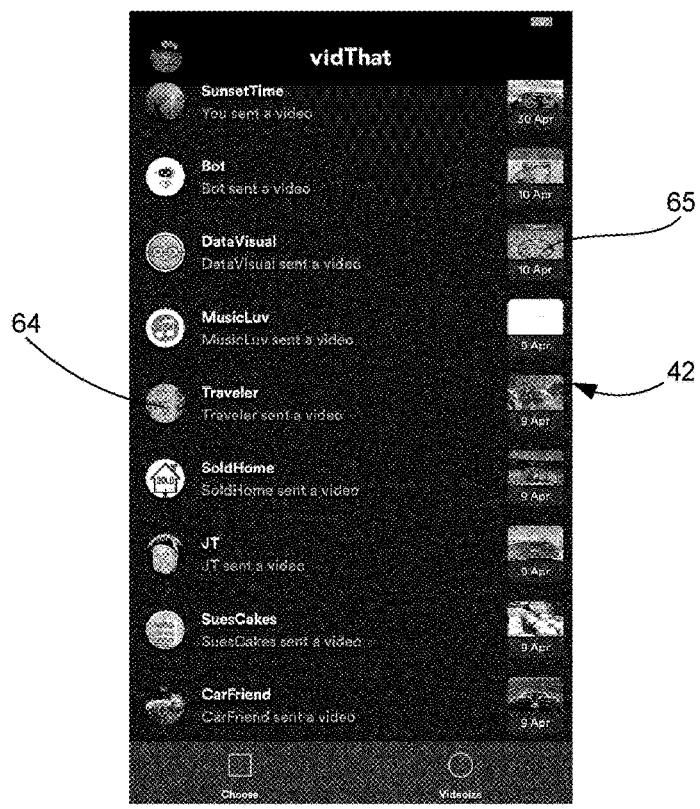
FIG. 4c shows an exemplary user interface.
Figure 4D:
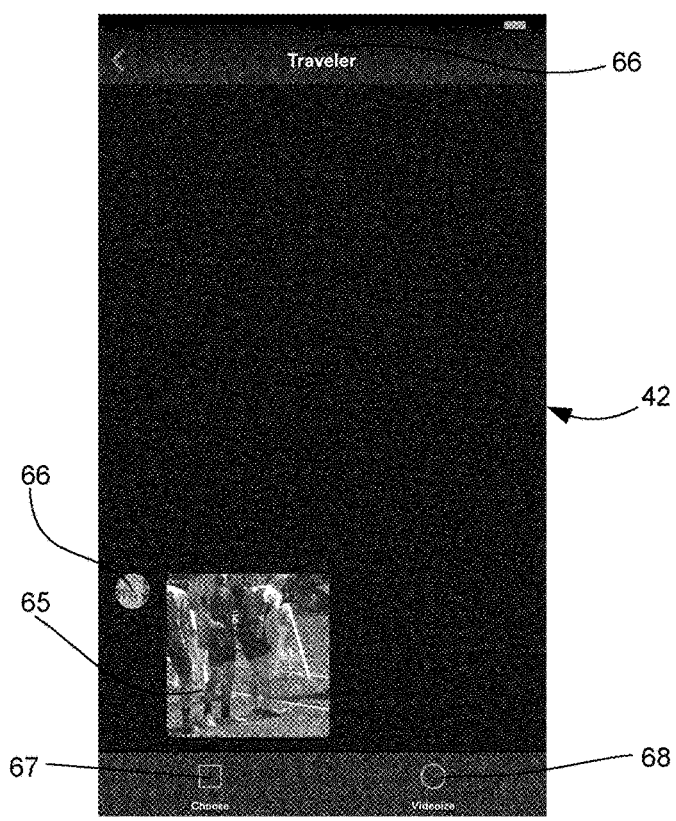
FIG. 4d shows another exemplary user interface.

In one exemplary implementation, mobile application 52 is used as a collaborative tool between users on a platform. For example, one can provide specific direction on changes to a design or project to another user. In more detail, looking at FIG. 4c, user A launches mobile application 52 and once user A's credentials are authenticated, exemplary user interface 39 showing a plurality of contacts 64 and associated messages 65 send by a user, or received by the user, is presented on display 42. FIG. 4d shows user interface 39 with message 65 received from sender 66. Details of sender 66, such as name and profile picture, are displayed on user interface 66. User A may choose to respond to received message 65 or create a new message by choosing images to share with the recipient 66 by enabling GUI element 67, or GUI element 68 to create a video message. As an example, user A selects images from the camera roll or user A takes several screen shots of the design on display 42, on user A captures images or video of the design using user device 12. In one example, the last predetermined number of images or videos captured by user device camera 50 or saved into memory 32 are auto-loaded onto user interface 39 for editing. In another example, the last predetermined number of images or videos captured by user device camera 50 or saved into memory 32 are auto-loaded onto user interface 39, as shown in FIG. 3a, such that a video can be made easily made. Accordingly, in FIG. 4c or 4d, the user may press GUI element 68 and user interface 39 of FIG. 3a is presented on display 42 and the user can immediately start making video, as described above. In one implementation, when GUI element 68 is pressed from FIG. 4c or 4d, images 22a-n are auto programmed with forward center zooming. Additionally, in the case in which a video is auto-loaded then the video is preset of start from the beginning when GUI element 68 is pressed from FIG. 4c or 4d.

Figure 5A:
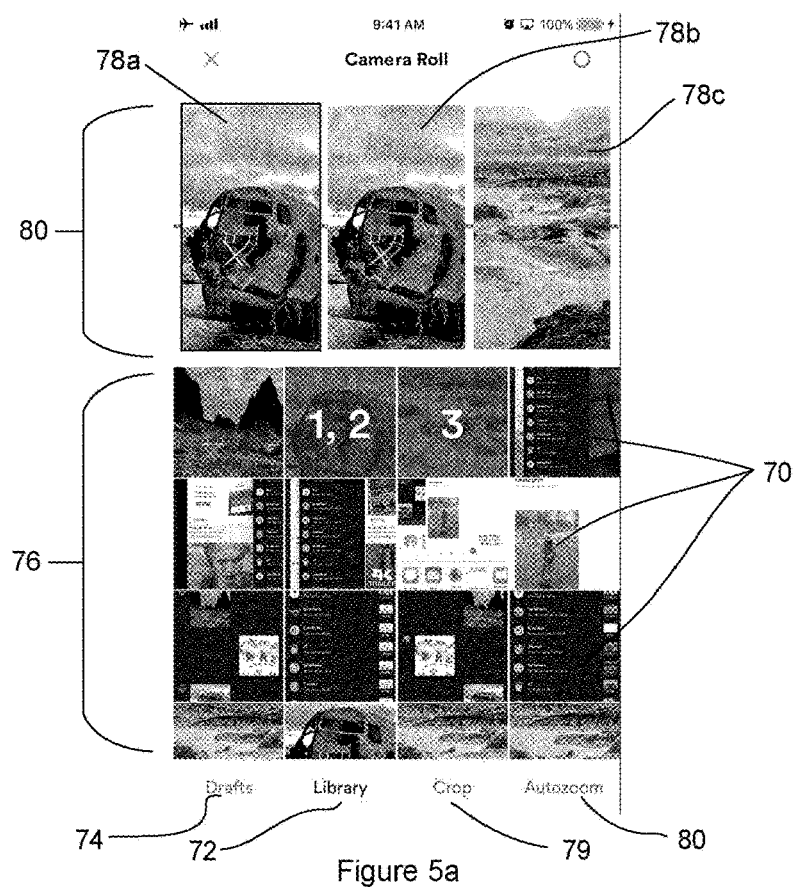
FIGS. 5a-5h and FIGS. 6a-6h show exemplary user interfaces for creating the video message file at an originating device.
Figure 5B:
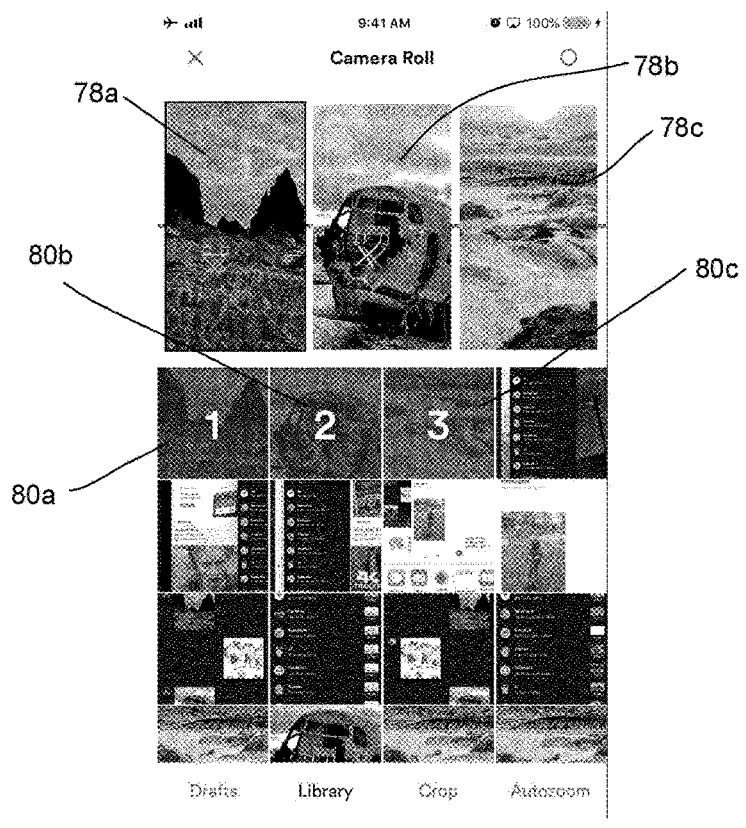

Accordingly, images 70 may be accessed from an image gallery via GUI element 72, or retrieved from a draft folder via GUI element 74, as shown in FIG. 5a. In one example, image gallery from the camera roll is accessed and presented on user interface 39 comprising a plurality of images 70 in lower user interface portion 76. The selected images 78a, 78b, 78c in the image gallery are marked in lower user interface portion 72, and the same selected images 78a, 78b, 78c are presented in upper user interface portion 80. As can be seen in FIG. 5a, image 78a and image 78b are identical, that is, one image was selected twice, whereas in FIG. 5b image 78a and image 78b are different. Once an appropriate predetermined number of images 78a, 78b, 78c has been selected, user A can edit images 78a, 78b, 78c, for example, by cropping them via GUI element 79 or by zooming them in or out via GUI element 80, or save them for future reference in a drafts folder. User interface 39 also comprises GUI element 81 for cancelling any of the actions e.g. image selection, and GUI element 82 for adding audio commentary to accompany any of selected images 78a, 78b and 78c.

Figure 5C:
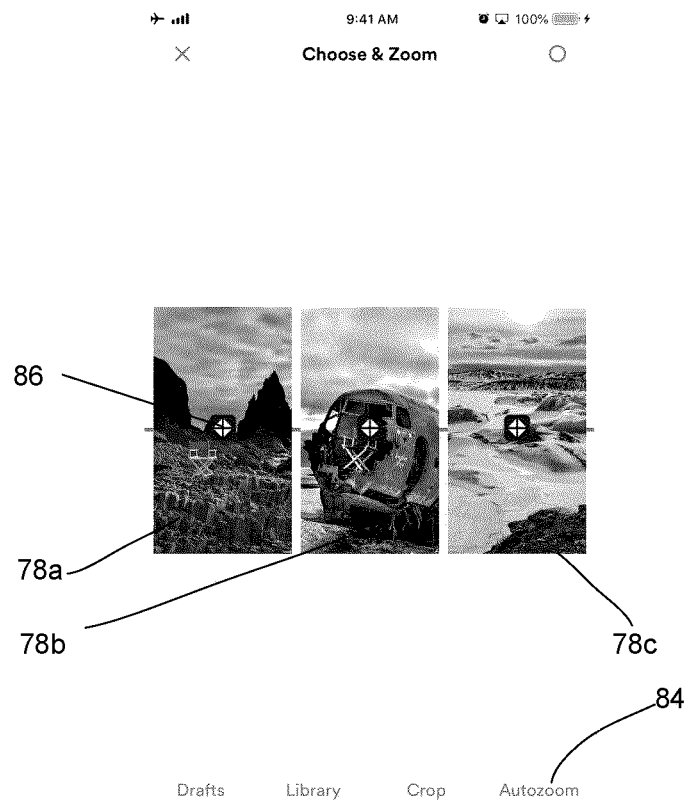
Figure 5D:
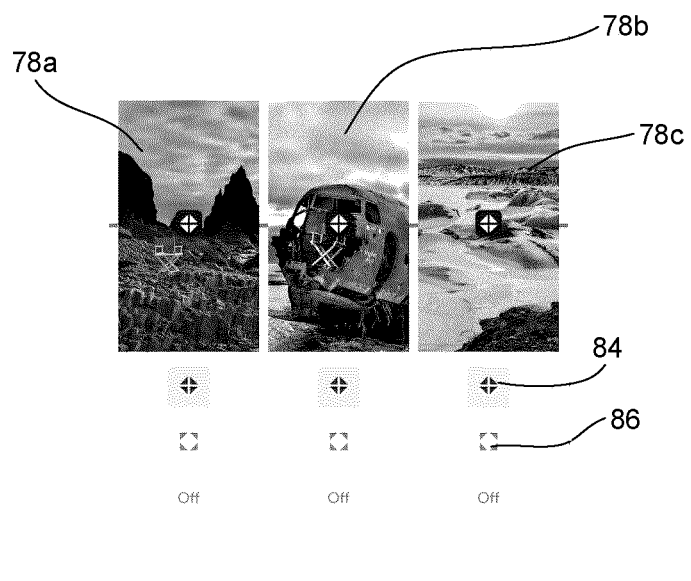
Figure 5E:
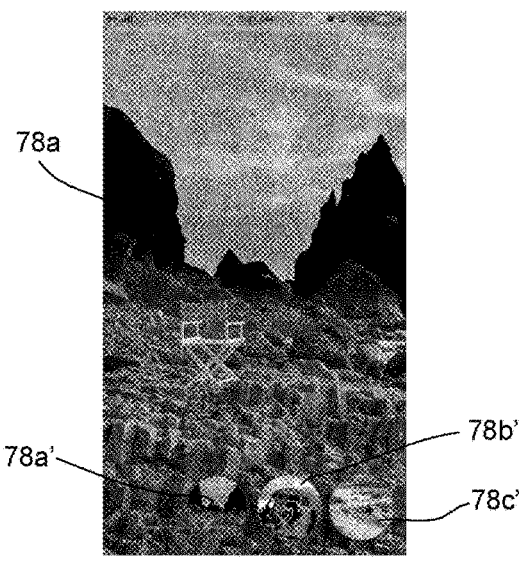
Figure 5F:
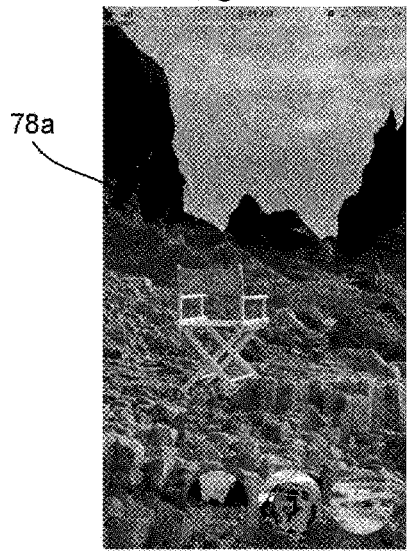
Figure 5G:
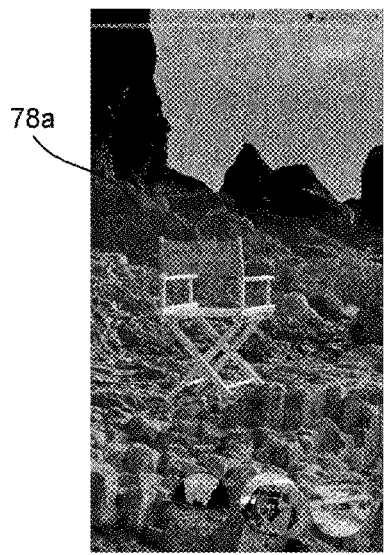

Accordingly, user A presses GUI element 80 to enable "Autozoom" functionality, as shown in FIGS. 5c and 5d, and images 78a, 78b, 78c are presented on user interface 39. Each of images 78a, 78b, 78c comprise GUI element 82 that is movable to any location on the particular image 78a, 78b, or 78c, for zooming, as shown FIG. 5c. The autozoom feature may be enabled by actuating GUI element 84 or disabled by actuating GUI element 86, as shown FIG. 5d. As an example, user A selects image 78a to apply the autozooming effect, and presses and moves GUI element 82 to a location on image 80a for a zooming effect, as shown in FIGS. 5e-i. The bottom portion of user interface 39 includes thumbnail images 78a', 78b', 78c' of images 78a, 78b, and 78c.

Figure 5H:
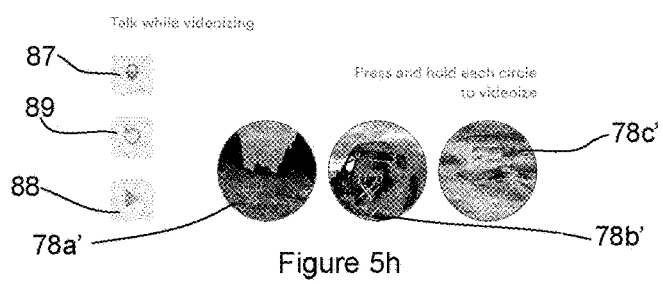
Figure 6A:
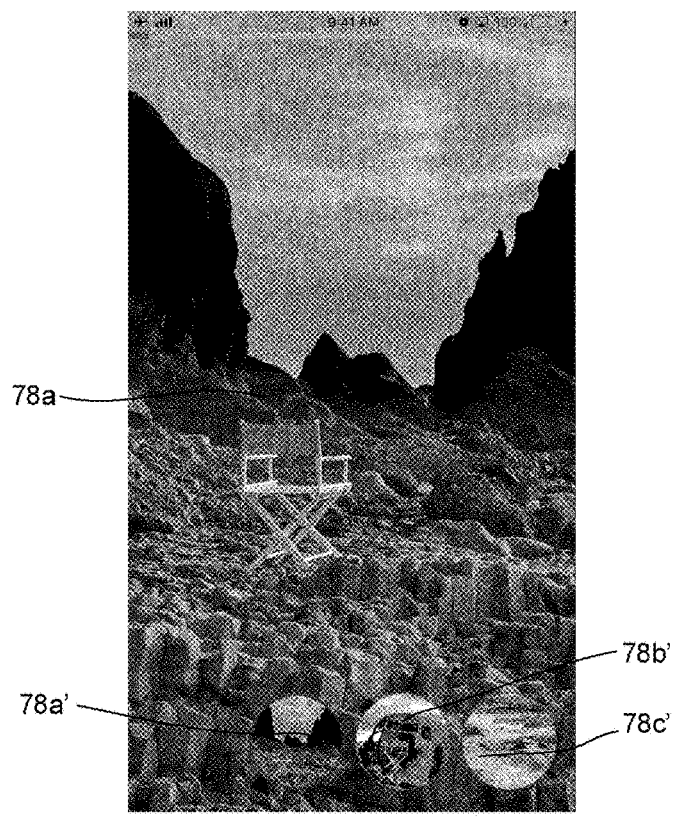
Figure 6B:
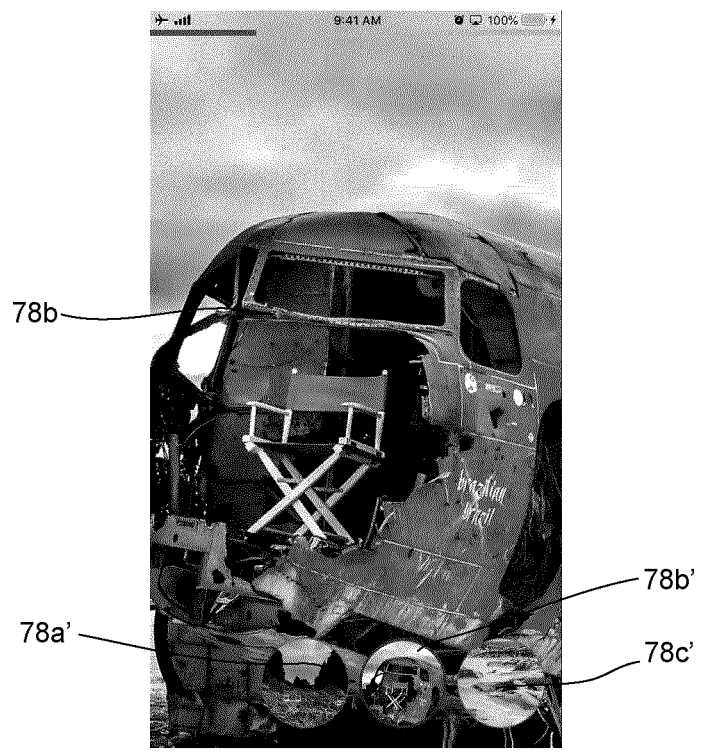
Figure 6C:
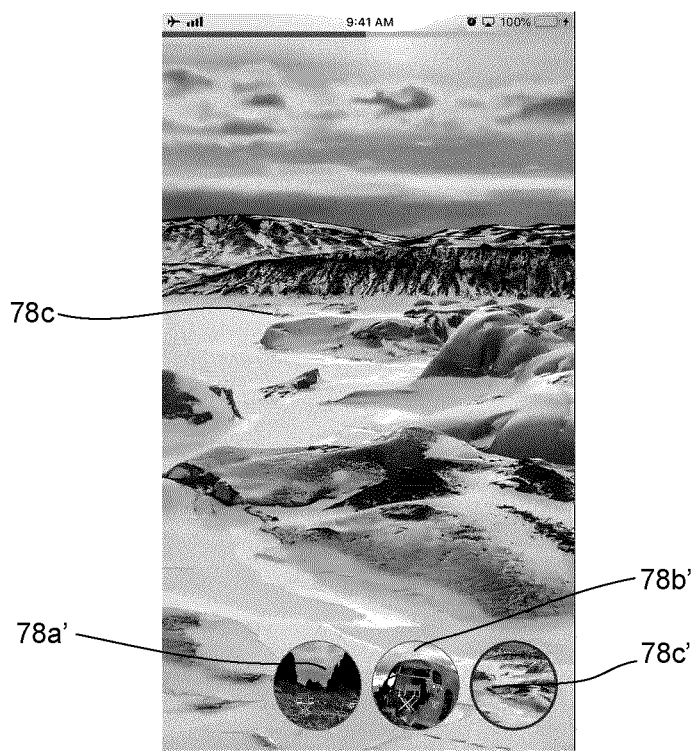

Now turning to FIG. 5h, there is shown user interface 39 which allows a user to add audio commentary via actuation of GUI element 87 to accompany any of images 78a, 78b or 78c. Accordingly, user can press one image 78a, 78b or 78c, at a time and create a video while commenting about image 78a, 78b or 78c. User is able to review the video and/or the audio commentary via play button 88 or edit the video and/or the audio commentary via "go back" button 89 and/or delete previous steps. For example, image 78a is selected, and image 78a is zoomed in or out on user interface 39, along with accompanying audio commentary, as shown FIG. 6a; then image 78a is selected, and image 78b is zoomed in or out on user interface 39, along with accompanying audio commentary, as shown FIG. 6b; and lastly image 78c is zoomed in or out on user interface 39, along with accompanying audio commentary, as shown FIG. 6c. User is able to edit the video and/or the audio commentary via "go back" button to review and/or delete previous steps.

Figure 6D:
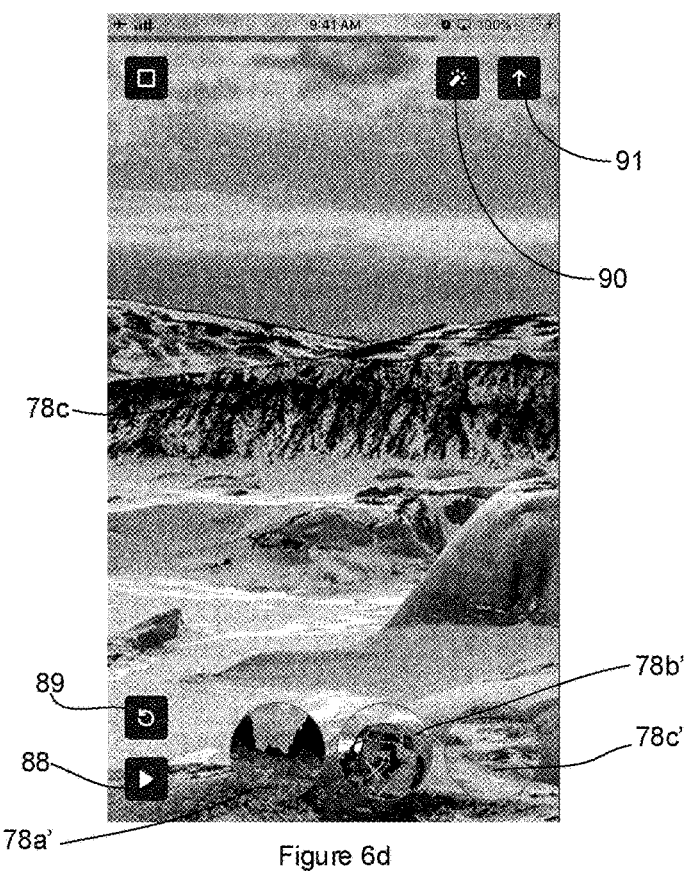

Accordingly, user describes the changes to the design while the zooming shows the area to be addressed, and the audio events and the image manipulation events are recorded concurrently, such that the user's voice is synchronized with the actions performed on image 78a, 78b or 78c. Once the video comprising images 78a, 78b, 78c and accompanying audio commentary is complete, user A may choose to review the video via GUI element 88, or edit the video via GUI element 90, or send to a recipient via GUI element 91, as shown in FIG. 6d. Editing of the video may include applying special effects or filters, or including text, images, emoticons, or emojis.

Figure 6E:
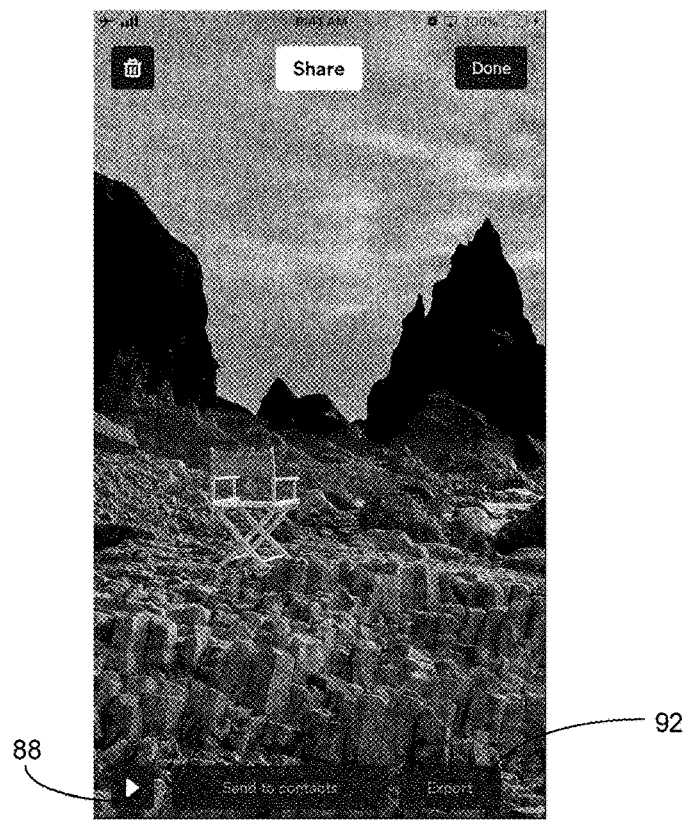
Figure 6F:
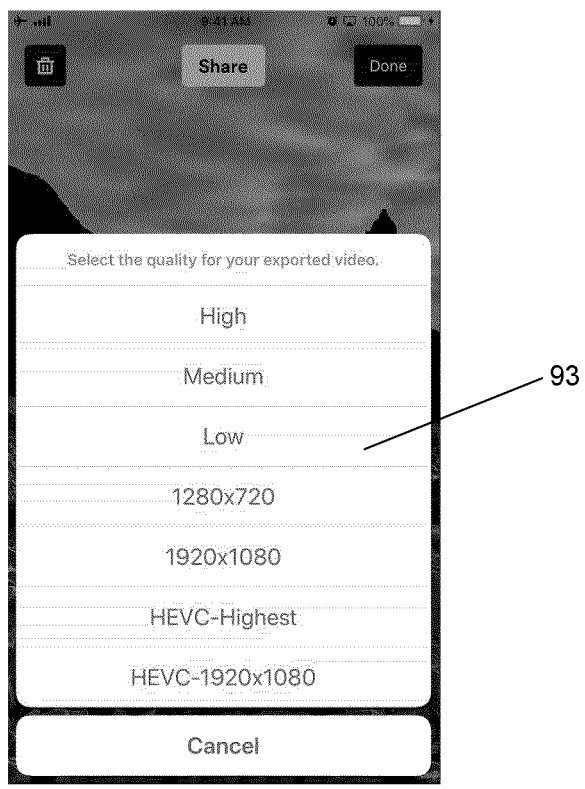
Figure 6G:
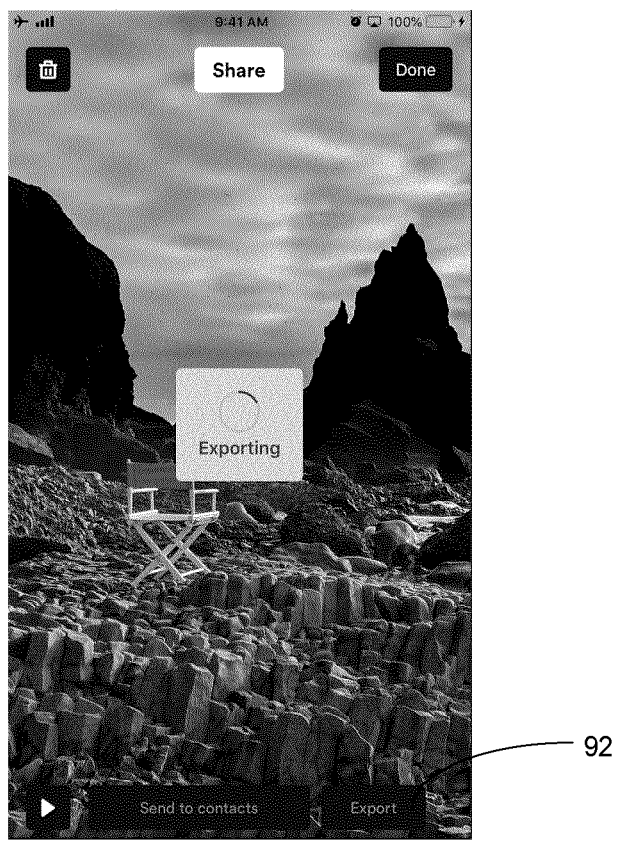
Figure 6H:
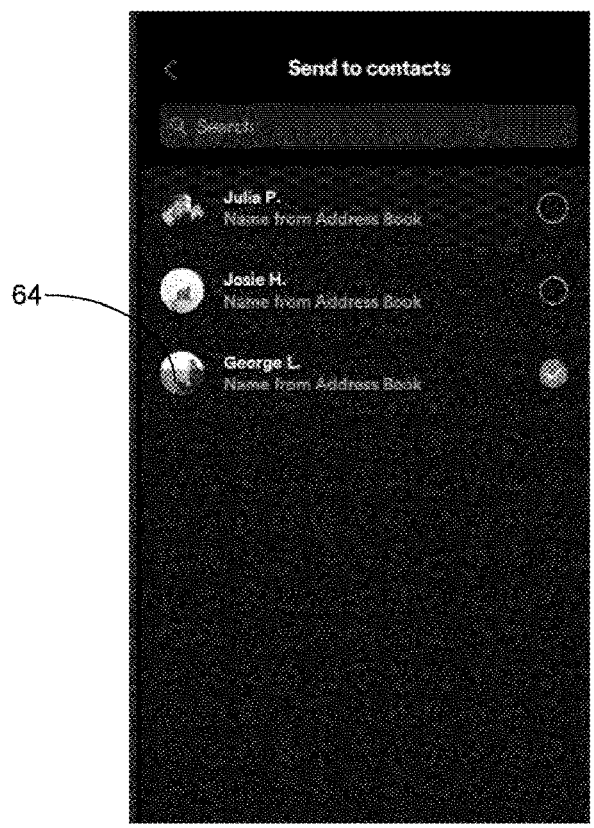

When user chooses to share the created video, GUI element 92 is selected to export the video into a predetermined format, as shown in FIG. 6e. The quality of the exported video 93 is selected e.g. High, Medium, Low, 1280×720, 1920×1080, HEVC-highest, HEVC-1920×1080, as shown in FIG. 6f, and the exporting process ensues in FIG. 6g. Recipients 64 of the video are then selected and the video is sent, as shown in FIG. 6h.

Figure 7A:
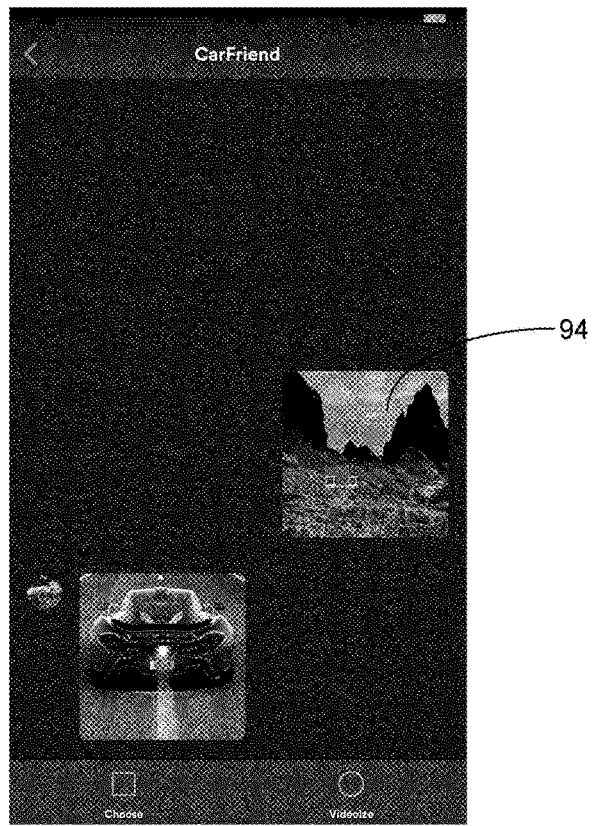
FIGS. 7a-7e show exemplary user interfaces for viewing and responding to the video message file at a recipient user device.
Figure 7B:
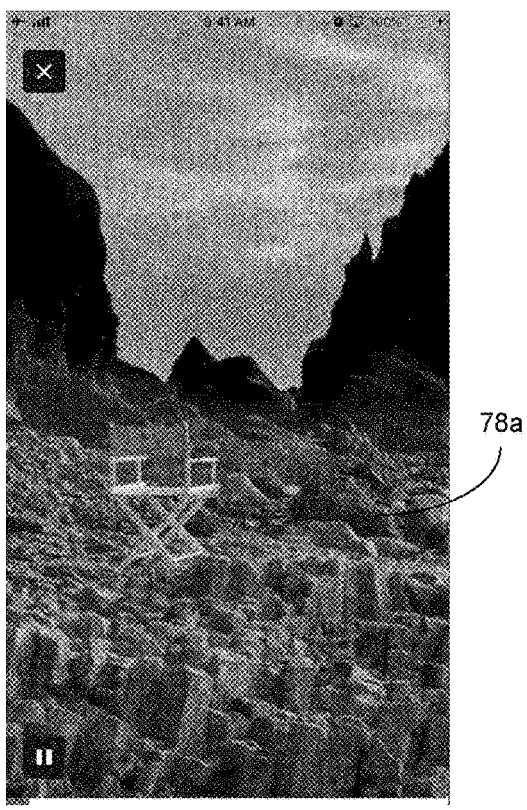
Figure 7C:
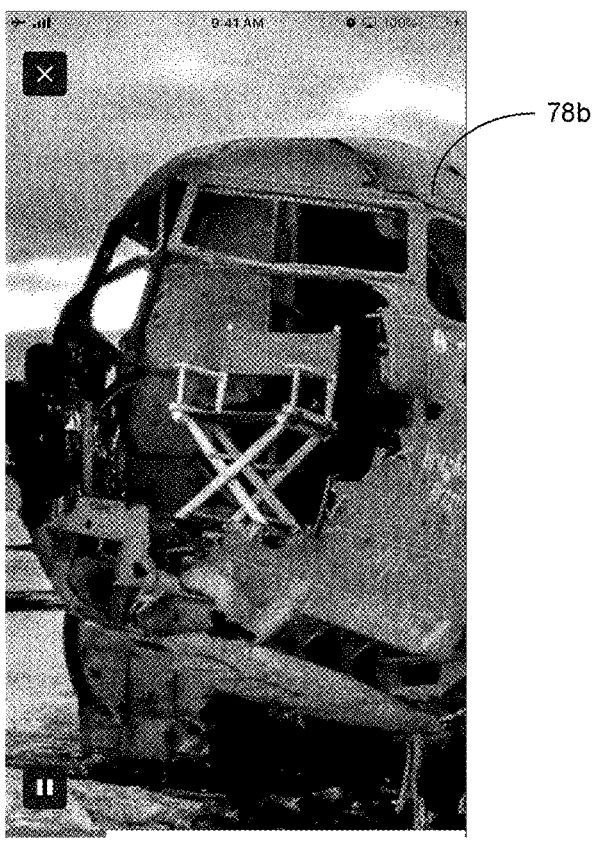
Figure 7D:
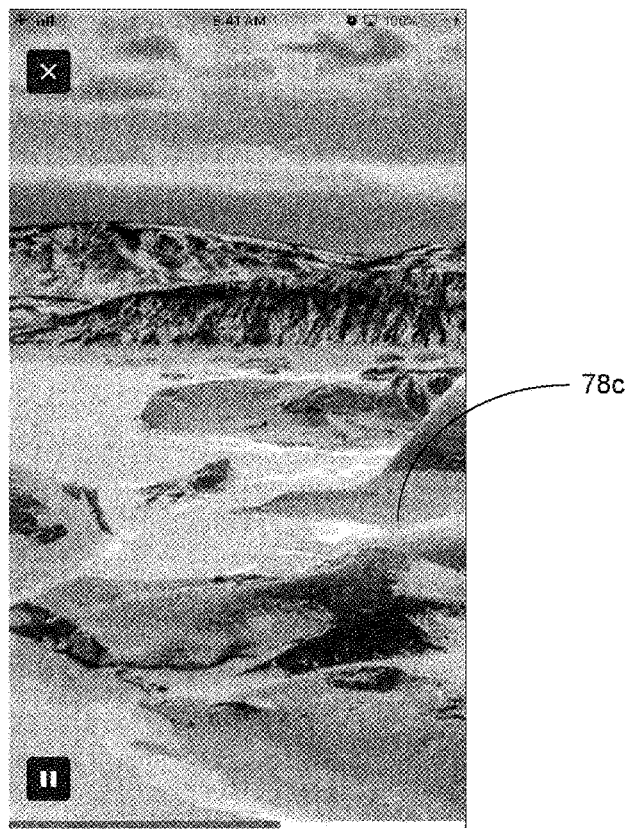
Figure 7E:
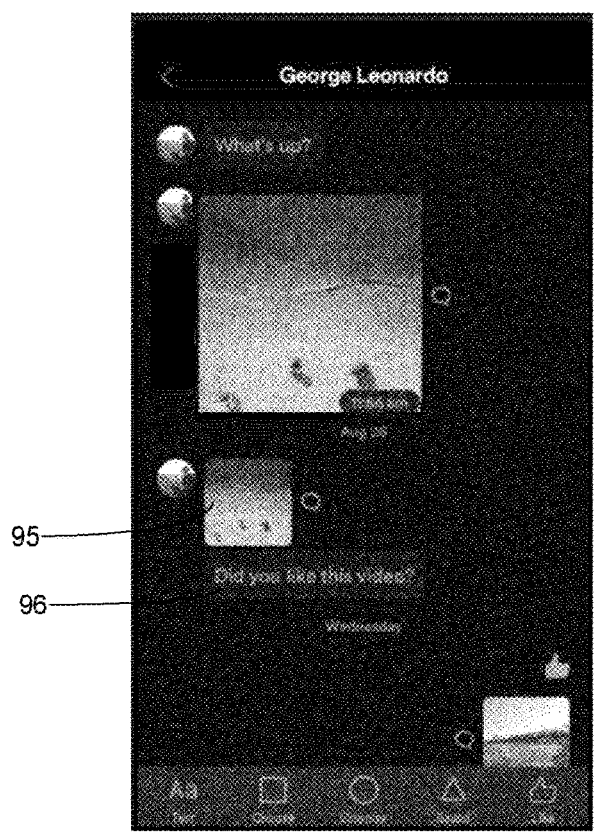

Looking at FIG. 7a, recipient user B receives message 94 within mobile application 52. Push notification alerts recipient user B to open the message and review the video within mobile application 52. User B plays message using player 55, as shown in FIGS. 7b-d. Recipient user B may provide feedback within the mobile application 52, or reply to the received video 95, as shown in FIG. 7e. Recipient user B may respond via contextual text messages to quickly reply to the video messages (contextual versus chronological) to any specific video sent or received. Accordingly, user B may simply tap beside video thumbnail 95 in the messenger and texting input field 96 is displayed, and a message thread is initiated.

In one exemplary implementation, real time and instantaneous voice to text transcription appears instantly in the finished video. As such, this feature is beneficial to the hearing impaired, or for users who prefer reading to sound (or if they are in noisy places).

In one exemplary implementation, once the video is created at the sender user A, then user A may scroll through the video, choose an image or frame that forms the thumbnail of the video message to be sent to recipient user B. In addition, the chosen image or frame may be edited e.g. crop, filter, and zoom in/out.

In one exemplary implementation, the recorded voice associated with the audio commentary may be altered or enhanced in real time.

In one exemplary implementation, a regular video message file 14 to be chosen and included alongside still images during the video message making process.

In one exemplary implementation, sender user A may include a signature at the end of the created video. For example, the signature may include information about the sender (e.g. name, contact info and picture, video, text), and may be restricted to a predetermined time period e.g. 3 seconds. As another example, the signature can include anything the user wishes and may be auto-programmed with a slow zoom to provide interest and aid in storytelling. Accordingly, the signature may be included automatically or can added by the user, and permits user personalization.

In one exemplary implementation, the created video includes a timeline displayed on user interface 39 during creation or playback.

Figure 8:
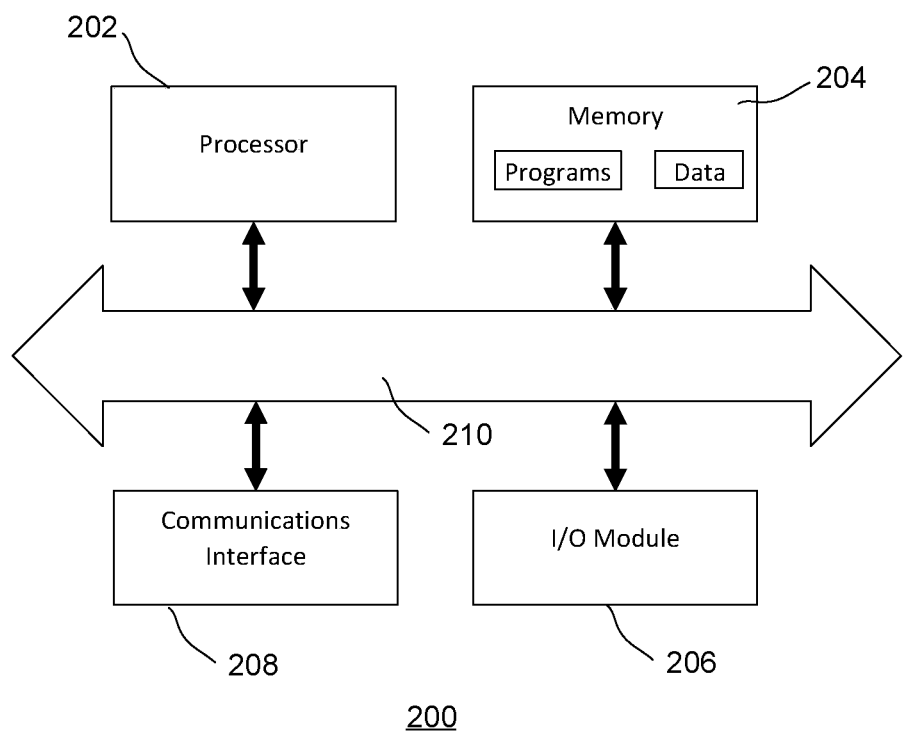
FIG. 8 shows an exemplary computing system.

Server computer 20 comprises computing system 200 comprising at least one processor such as processor 202, at least one memory such as memory 204, input/output (I/O) module 206 and communication interface 208, as shown in FIG. 8. Although computing system 200 is depicted to include only one processor 202, computing system 200 may include more number of processors therein. In an embodiment, memory 204 is capable of storing instructions. Further, the processor 202 is capable of executing instructions.

In one exemplary implementation, processor 202 may be configured to execute hard-coded functionality. In an embodiment, processor 202 may be embodied as an executor of software instructions, wherein the software instructions may specifically configure processor 202 to perform algorithms and/or operations described herein when the software instructions are executed, such as creating, editing, transmitting/receiving short videos.

In one exemplary implementation, processor 202 may be embodied as a multi-core processor, a single core processor, or a combination of one or more multi-core processors and one or more single core processors. For example, processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, Application-Specific Standard Products (ASSPs), System-on-a-nhip systems (SOCs), Complex Programmable Logic Devices (CPLDs), Graphics Processing Units (GPUs), and the like. For example, some or all of the device functionality or method sequences may be performed by one or more hardware logic components.

Memory 204 may be embodied as one or more volatile memory devices, one or more non-volatile memory devices, and/or a combination of one or more volatile memory devices and non-volatile memory devices. For example, memory 204 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY™ Disc), and semiconductor memories (such as mask ROM, PROM (programmable ROM), EPROM (erasable PROM), flash ROM, RAM (random access memory), etc.).

I/O module 206 is configured to facilitate provisioning of an output to a user of computing system 200 and/or for receiving an input from the user of computing system 200. I/O module 206 is configured to be in communication with processor 202 and memory 204. Examples of the I/O module 206 include, but are not limited to, an input interface and/or an output interface. Some examples of the input interface may include, but are not limited to, a keyboard, a mouse, a joystick, a keypad, a touch screen, soft keys, a microphone, and the like. Some examples of the output interface may include, but are not limited to, a microphone, a speaker, a ringer, a vibrator, a light emitting diode display, a thin-film transistor (TFT) display, a liquid crystal display, an active-matrix organic light-emitting diode (AMOLED) display, and the like. In an example embodiment, processor 202 may include I/O circuitry configured to control at least some functions of one or more elements of I/O module 206, such as, for example, a speaker, a microphone, a display, and/or the like. Processor 202 and/or the I/O circuitry may be configured to control one or more functions of the one or more elements of I/O module 206 through computer program instructions, for example, software and/or firmware, stored on a memory, for example, the memory 204, and/or the like, accessible to the processor 202.

Communication interface 208 enables computing system 200 to communicate with other entities over various types of wired, wireless or combinations of wired and wireless networks, such as for example, the Internet. In at least one example embodiment, the communication interface 208 includes transceiver circuitry configured to enable transmission and reception of data signals over the various types of communication networks. In some embodiments, communication interface 208 may include appropriate data compression and encoding mechanisms for securely transmitting and receiving data over the communication networks. Communication interface 208 facilitates communication between computing system 200 and I/O peripherals.

In an embodiment, various components of computing system 200, such as processor 202, memory 204, I/O module 206 and communication interface 208 may be configured to communicate with each other via or through a centralized circuit system 210. Centralized circuit system 210 may be various devices configured to, among other things, provide or enable communication between the components (202-208) of computing system 200. In certain embodiments, centralized circuit system 210 may be a central printed circuit board (PCB) such as a motherboard, a main board, a system board, or a logic board. Centralized circuit system 210 may also, or alternatively, include other printed circuit assemblies (PCAs) or communication channel media.

It is noted that various example embodiments as described herein may be implemented in a wide variety of devices, network configurations and applications.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, server computers, minicomputers, mainframe computers, and the like. Accordingly, system 10 may be coupled to these external devices via the communication, such that system 10 is controllable remotely. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In another implementation, system 10 follows a cloud computing model, by providing an on-demand network access to a shared pool of configurable computing resources (e.g., servers, storage, applications, and/or services) that can be rapidly provisioned and released with minimal or nor resource management effort, including interaction with a service provider, by a user (operator of a thin client).

The benefits and advantages described above may relate to one embodiment or may relate to several embodiments. The embodiments are not limited to those that solve any or all of the stated problems or those that have any or all of the stated benefits and advantages. The operations of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A messaging method in which a first communication device comprises a first processor and a first computer readable medium with instructions stored thereon, the instructions are executable by the first processor to perform operations of at least:
 a) selecting a first at least one image stored on the first computer readable medium associated with the first communication device;
 b) presenting the first at least one image on a first touch-sensitive display screen associated with the first communication device;
 c) detecting a first user's touch on the first at least one image on the first touch-sensitive display screen to actuate recording of a first audio signal via a first microphone associated with the first communication device to generate first audio data;
 d) manipulating the at least one image to augment the at least one image;
 e) simultaneously recording a first on-screen video while manipulating the first at least one image to generate first video data;
 f) initiating a first timeline associated with the recording of the first audio signal and the recording of the first on-screen video;
 g) detecting the absence of the first user's touch on the first at least one image on the first touch-sensitive display screen to terminate recording of the first audio signal and terminating the first timeline;
 h) storing in a first message file on the first computer readable medium the first video data, the first audio data, the first timeline, and first metadata associated with at least one of the at least one image, the first on-screen video, the first audio signal, the first timeline; and
 i) transmitting the first message file to a second communication device.

2. The method of claim 1, wherein at the second communication device comprising a second processor and a second computer readable medium with instructions stored thereon, the instructions executable by the second processor to perform operations of at least, receiving the first message file and storing the first message file on a second computer readable medium;
 k) accessing the stored first video data, the first audio data, the first timeline, and first metadata;
 l) presenting on a second touch-sensitive display screen associated with the second communication device the first on-screen video and the first audio signal in accordance with the first timeline;
 m) detecting a second user's touch on the first on-screen video on the second touch-sensitive display screen to actuate recording of a second audio signal via a second microphone associated with the second communication device;
 n) erasing the stored first video data, the first audio data, the first timeline, and first metadata while preserving the at least one image;
 o) manipulating the first at least one image to augment the at least one image;
 p) simultaneously recording a second on-screen video while manipulating the at least one image;
 q) initiating a second timeline associated with the recording of the second audio signal and the recording of the second on-screen video, and generating second audio data and second video data;
 r) detecting the absence of the second user's touch on the first at least one image on the second touch-sensitive display screen to terminate recording of the second audio signal and terminating the second timeline;
 s) storing in a second message file on the second computer readable medium the second video data, the second audio data, the second timeline, and second metadata associated with at least one of the at least one image, the second on-screen video, the second audio signal, and the second timeline; and
 t) transmitting the second message file to the first communication device.

3. The method of claim 2, wherein at the first communication device,
 receiving the second message file and storing the second message file on the first computer readable medium;
 accessing the stored second video data, the second audio data, the second timeline, and second metadata;
 presenting on the first touch-sensitive display screen associated with the first communication device the second on-screen video and the second audio signal in accordance with the second timeline.

4. The method of claim 3, wherein at the second communication device,
 selecting a second at least one image stored on the second computer readable medium associated with the second communication device;
 presenting the second at least one image on the second touch-sensitive display screen associated with the second communication device;
 detecting the second user's touch on the second at least one image on the second touch-sensitive display screen to actuate recording of a third audio signal via the second microphone associated with the second device to generate third audio data;
 manipulating the second at least image to augment the second at least one image;
 simultaneously recording a third on-screen video while manipulating the second at least one image to generate third video data;

initiating a third timeline associated with the recording of the third audio signal and the recording of the third on-screen video;

detecting the absence of the second user's touch on the second at least one image on the second touch-sensitive display screen to terminate recording of the third audio signal and terminating the third timeline;

storing in the second message file on the second computer readable medium the third video data, the third audio data, the third timeline, and third metadata associated with at least one of the second at least one image, the third on-screen video, the third audio signal, the third timeline; and transmitting the second message file to the first communication device.

5. The method of claim 4, wherein at the first communication device, receiving the second message file and storing the second message file on the first computer readable medium;

accessing the stored third video data, the third audio data, the third timeline, and third metadata;

presenting on the first touch-sensitive display screen associated with the first communication device the third on-screen video and the third audio signal in accordance with the third timeline.

6. The method of claim 5, wherein multiple images are selectable and are manipulable to generate with corresponding video data and audio data.

7. The method of claim 2, wherein at least one of the first message file and the second message file is transmitted to a plurality communication devices.

8. The method of claim 4, wherein the first audio signal, the second audio signal and third audio signal are transcribed on the corresponding on-screen video during presentation at a recipient device.

9. The method of claim 4, wherein step of manipulating one of the first at least one image and the second at least one image comprises at least one of crossfading from the first at least one image and the second at least one image, zooming in, zooming out, on at least one portion of the first at least one image and/or the second at least one image, an animation, a zoom effect, a parallax zoom effect, a special effect, a filter, a sound, music, performing at least one effect on at least one portion of the first at least one image and/or the second at least one image.

10. The method of claim 4, wherein the first message and the second message are transmitted via a remote computing device in a communication network.

11. The method of claim 4, wherein a last predetermined number of the at least one images captured by a first camera associated with the first communication device or stored in the first computer readable medium are auto-loaded onto the first touch-sensitive display screen for manipulation or animation or a last predetermined number of the at least one images captured by a second camera associated with the second communication device or stored in the second computer readable medium are auto-loaded onto the second touch-sensitive display screen for manipulation or animation.

12. A messaging method in which a first communication device comprises a first processor and a first computer readable medium with instructions stored thereon, the instructions are executable by the first processor to perform operations of at least:

at the first communication device, (a) detecting a touch on a first at least one image on a first touch-sensitive display screen to actuate recording of a first audio signal via a first microphone associated with the first communication device to generate first audio data;

b) manipulating the at least image to create an augmented first at least one image;

c) simultaneously recording the creation of the augmented first at least one image to generate first video data;

d) initiating a first timeline associated with the recording of the first audio signal and the recording the creation of the augmented first at least one image;

e) detecting the absence of the touch on the first at least one image on the first touch-sensitive display screen to terminate recording of the first audio signal and terminating the first timeline;

f) storing in a first message file on the first computer readable medium the first video data, the first audio data, the first timeline, and first metadata associated with at least one of the at least one image, the first on-screen video, the first audio signal, the first timeline; and g) transmitting the first message file for playback at a second communication device.

13. The method of claim 12, wherein at the second communication device comprising a second processor and a second computer readable medium with instructions stored thereon, the instructions executable by the second processor to perform operations of at least:

h) receiving the first message file and storing the first message file on a second computer readable medium;

i) accessing the stored first video data, the first audio data, the first timeline, and first metadata;

j) presenting on a second touch-sensitive display screen associated with the second communication device the first on-screen video and the first audio signal in accordance with the first timeline;

k) detecting a second user's touch on the first on-screen video on the second touch-sensitive display screen to actuate recording of a second audio signal via a second microphone associated with the second communication device;

l) erasing the stored first video data, the first audio data, the first timeline, and first metadata while preserving the first at least one image;

m) manipulating the first at least one image to create a new augmented first at least one image;

n) simultaneously recording the creation of the new augmented first at least one image to generate second video data;

o) initiating a second timeline associated with the recording of the second audio signal and the recording the creation of the new augmented first at least one image;

p) detecting the absence of the second user's touch on the first at least one image on the second touch-sensitive display screen to terminate recording of the second audio signal and terminating the second timeline;

q) storing in a second message file on the second computer readable medium the second video data, the second audio data, the second timeline, and second metadata associated with at least one of the at least one image, the second on-screen video, the second audio signal, and the second timeline;

r) transmitting the second message file to the first communication device;

s) at the first communication device, receiving the second message file and storing the second message file on the first computer readable medium;

t) accessing the stored second video data, the second audio data, the second timeline, and second metadata; and u) presenting on the first touch-sensitive display screen associated with the first communication device the second on-screen video and the second audio signal in accordance with the second timeline.

14. The method of claim 13, wherein a last predetermined number of the at least one images captured by a first camera associated with the first communication device or stored in the first computer readable medium are auto-loaded onto the first touch-sensitive display screen for manipulation or animation and/or a last predetermined number of the at least one images captured by a second camera associated with the second communication device or stored in the second computer readable medium are auto-loaded onto the second touch-sensitive display screen for manipulation or animation.

15. The method of claim 13, wherein when preset animations are enabled then the preset animations are automatically effected on the at least one images.

16. The method of claim 15, wherein the generated video data is further enhanced by adding at least one of special effects, filters, zoom effects, music, and sounds, and any combination thereof.

17. A communication system comprising an originating device comprising a first processor and a first computer readable medium with first instructions stored thereon, and a recipient device comprising a second computer readable medium with second instructions stored thereon, the second instructions executable by the second processor to perform operations of at least comprising the steps of:

at the recipient device, a) receiving a first message file from the originating device and storing the first message file on a second computer readable medium associated with the recipient device, said first message file comprising first video data comprising a first on-screen video associated with an augmented first image, first audio data comprising a first audio signal, a first timeline associated with the augmented first image and the first audio signal, and first metadata;

b) accessing the stored first video data, the first audio data, the first timeline, and first metadata;

c) presenting on a second touch-sensitive display screen associated with the recipient device the first on-screen video and the first audio signal in accordance with the first timeline;

d) detecting a recipient's touch on the first on-screen video on the second touch-sensitive display screen to actuate recording of a second audio signal via a second microphone associated with the recipient device;

e) erasing the stored first video data, the first audio data, the first timeline, and first metadata while preserving the first at least one image;

f) manipulating the first at least one image to create a new augmented first at least one image;

g) simultaneously recording the creation of the new augmented first at least one image to generate second video data;

h) initiating a second timeline associated with the recording of the second audio signal and the recording the creation of the new augmented first at least one image;

i) detecting the absence of the recipient's touch on the first at least one image on the second touch-sensitive display screen to terminate recording of the second audio signal and terminating the second timeline;

j) storing in a second message file on the second computer readable medium the second video data, the second audio data, the second timeline, and second metadata associated with at least one of the at least one image, the second on-screen video, the second audio signal, and the second timeline;

k) transmitting the second message file to the originating device;

l) at the originating device, receiving the second message file and storing the second message file on the first computer readable medium;

m) accessing the stored second video data, the second audio data, the second timeline, and second metadata; and n) presenting on the first touch-sensitive display screen associated with the originating device the second on-screen video and the second audio signal in accordance with the second timeline.

18. The communication system of claim 17, wherein the step of manipulating one of the first at least one image and the second at least one image comprises at least one of crossfading from the first at least one image and the second at least one image, zooming in, zooming out, on at least one portion of the first at least one image and the second at least one image, an animation, a zoom effect, a parallax zoom effect, a special effect, a filter, a sound, music, performing at least one effect on at least one portion of the first at least one image and the second at least one image.

19. The communication system of claim 17, wherein a last predetermined number of the at least one images captured by a first camera associated with the first communication device or stored in the first computer readable medium are auto-loaded onto the first touch-sensitive display screen for manipulation or animation or a last predetermined number of the at least one images captured by a second camera associated with the second communication device or stored in the second computer readable medium are auto-loaded onto a second touch-sensitive display screen for manipulation or animation.

20. A method of creating a video at a first communication device, the first communication device comprising a processor and a computer readable medium with instructions stored thereon, the instructions executable by the processor to at least:

auto-load a predetermined number of images captured by a camera associated with the first communication device or stored in the computer readable medium are auto-loaded onto a touch-sensitive display screen associated with the first communication device;

implement at least one preset animation on the predetermined number of images to create augmented images and generate a first video data; and actuate recording of a first audio signal via a microphone associated with the first communication device to generate first audio data, wherein the first audio signal pertains to the augmented images.

21. The method of claim 20, wherein the instructions are executable by the processor to at least:

include a first timeline associated with the recording of the first audio signal pertaining to the augmented images.

22. The method of claim 21, wherein the instructions are executable by the processor to at least:

store in a first message file on the first computer readable medium the first video data, the first audio data, the first timeline, and first metadata associated with the predetermined number of images, the augmented images, the first audio signal, the first timeline.

23. The method of claim 22, wherein the first timeline is predefined.

24. The method of claim 22, wherein the first timeline comprises a threshold time, such that the first audio signal includes a duration limited to the threshold time.

25. The method of claim 22, wherein the instructions are executable by the processor to at least:

transmit the first message file for playback at a second communication device.

\* \* \* \* \*